Dec. 16, 1958 W. E. AMBERG 2,864,245
ROTARY TORQUE TRANSMITTING JOINT
Filed Dec. 28, 1954 3 Sheets-Sheet 1
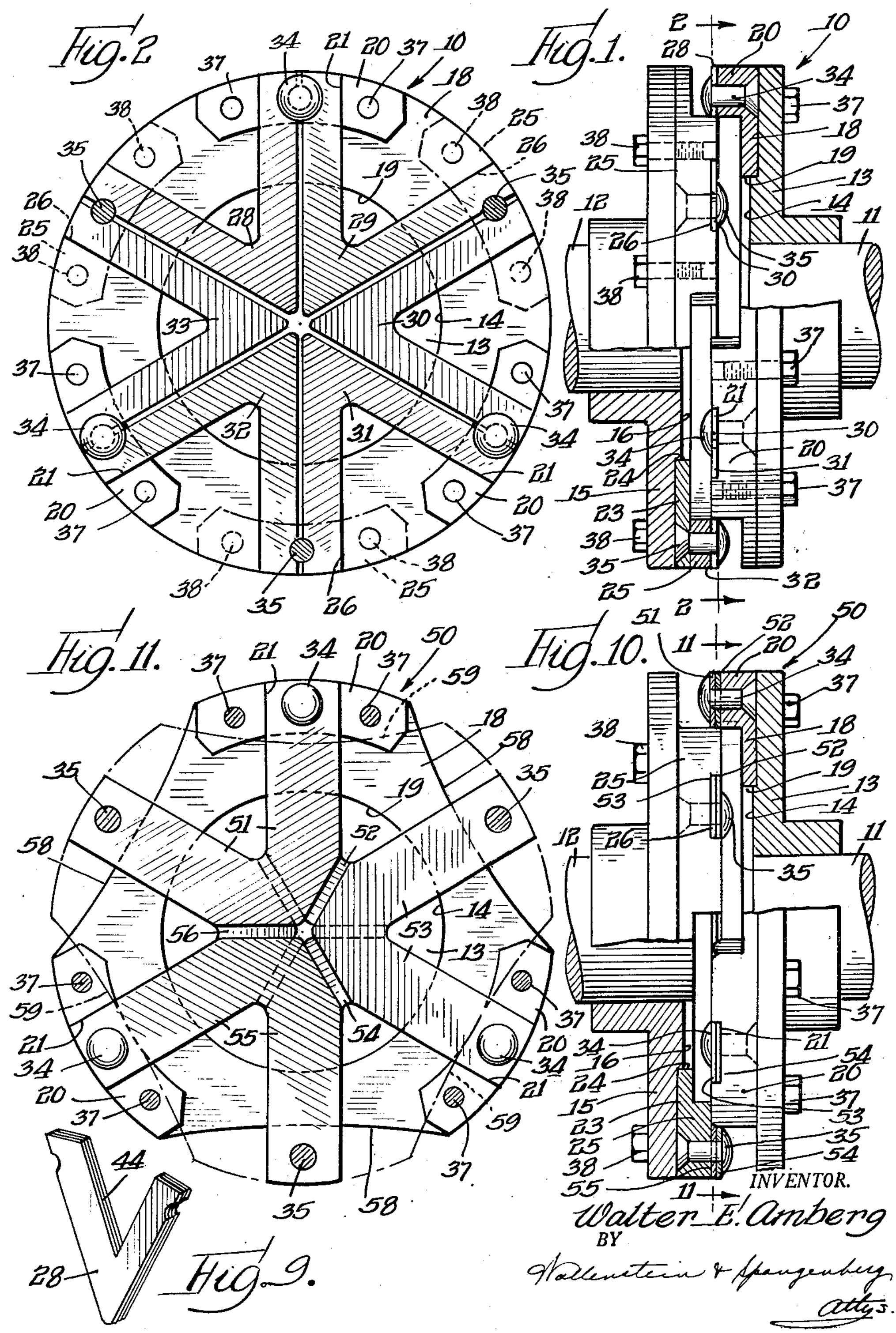
INVENTOR.
Walter E. Amberg
BY
Wallenstein & Spangenberg
attys.

Dec. 16, 1958 W. E. AMBERG 2,864,245
ROTARY TORQUE TRANSMITTING JOINT
Filed Dec. 28, 1954 3 Sheets-Sheet 2
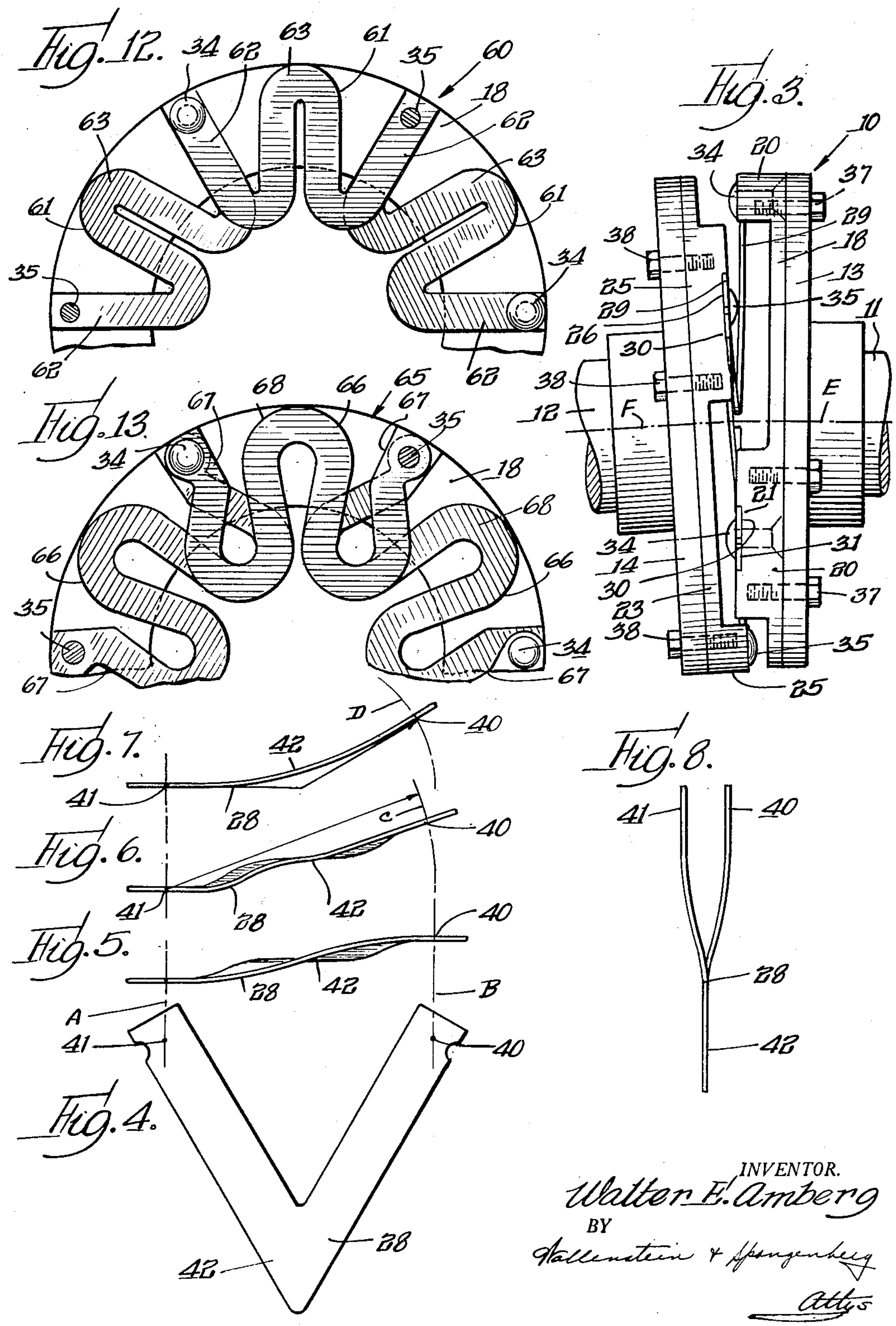
INVENTOR.
Walter E. Amberg
BY
Wallenstein & Spangenberg
Attys Dec. 16, 1958 W. E. AMBERG 2,864,245
ROTARY TORQUE TRANSMITTING JOINT
Filed Dec. 28, 1954 3 Sheets-Sheet 3
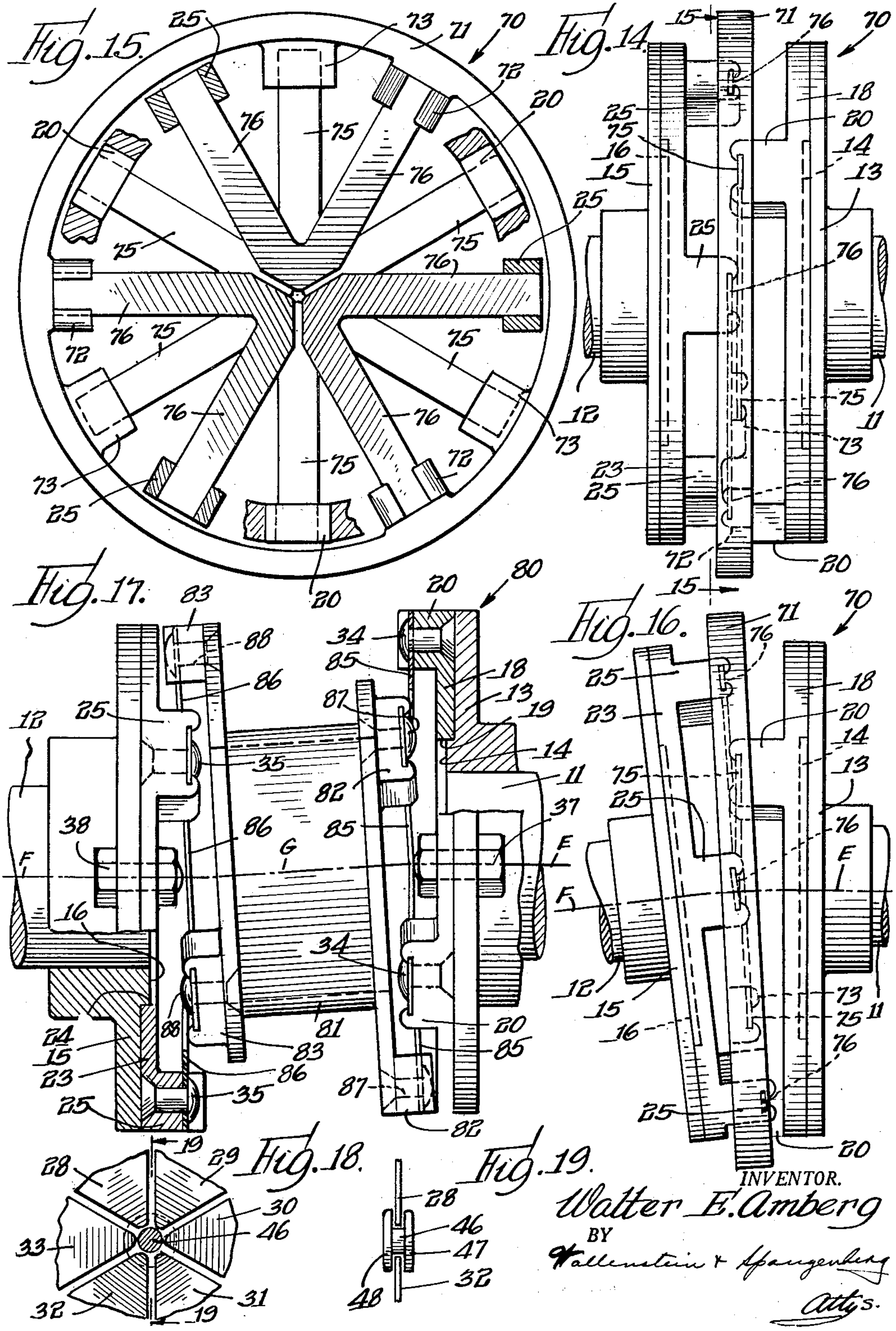
INVENTOR.
Walter E. Amberg
BY
Wallenstein & Spangenberg
Attys.

United States Patent Office 2,864,245

Patented Dec. 16, 1958

1

2,864,245

ROTARY TORQUE TRANSMITTING JOINT

Walter E. Amberg, Chicago, Ill.

Application December 28, 1954, Serial No. 478,027

20 Claims. (Cl. 64—12)

The principal object of this invention is to provide a new rotary torque transmitting joint for transmitting torque between a pair of rotating members or shafts, wherein the torque transmitted between them remains substantially constant, wherein the angular velocity of the driven member or shaft remains substantially constant with that of the driving member or shaft, wherein the formation of fatiguing stresses are effectively prevented, wherein relatively slidable or otherwise relatively movable parts are eliminated so that lubrication of the joint is not necessary, wherein maximum torque transmitting efficiency is provided, wherein the joint is simple and inexpensive in construction and yet is capable of effectively handling extremely high torque loads, and wherein the joint may be formed as a unit and readily coupled between the rotating members or shafts without disturbing the latter.

Briefly, the rotary torque transmitting joint of this invention includes a driving member rotating about an axis, a driven member rotating about an axis, and a plurality of open throated links arranged substantially in a torque transmitting plane between the driving and driven members and having end arms extending substantially radially outwardly from the axes of rotation of the driving and driven members. The links are substantially inflexible in the direction of the torque transmitting plane but substantially flexible in a direction normal to the torque transmitting plane. The outer end of one end arm of each link is rigidly secured to the driving member and the outer end of the other end arm of each link is rigidly secured to the driven member. The inflexibility of the links in the direction of the torque transmitting plane maintains substantially constant the angular positions of the driving and driven members about their axes of rotation for transmitting substantially constant torque therebetween at substantially constant angular velocity. The flexibility of the links in a direction normal to the torque transmitting plane allows angular displacement of the axes of rotation of the driving and driven members without producing fatiguing stresses in the direction of the torque transmitting plane.

While the open throated outwardly facing links may be constructed in various ways, they may advantageously be constructed in the form of leaf spring links which are wide and substantially inflexible in the direction of the torque transmitting plane and thin and substantially flexible in a direction normal to the torque transmitting plane. To provide extremely high torque transmission laminations of these open throated leaf spring links may be utilized. The open throated links may have various configurations to provide rigidity in the direction of the torque transmitting plane and flexibility in the direction normal to that plane, but one which is simple and provides extremely satisfactory operation is a V-shaped link. The links may be arranged edge to edge in the torque transmitting plane or the end arms thereof may be arranged in overlapping relation. To prevent collapsing of the links upon the occurrance of an over-load means may

2 be provided for confining the inner portions of the links substantially in the torque transmitting plane.

The rotary torque transmitting joint of this invention may be utilized as a universal joint between a pair of shafts and, in addition to possessing the aforementioned features, it also has the feature of automatically maintaining the axes of the shafts in intersecting position without any danger of whipping or oscillation of the joint. In this respect, and to facilitate mounting, the joint as a unit may be inserted between a driving hub carried by the driving shaft and a driven hub carried by the driven shaft, and secured in place by detachably fastening the driving member of the unit to the driving hub and the driven member of the unit to the driven hub. This may be readily done without interfering with the hubs or the shafts since the joint unit is readily collapsible for insertion therebetween.

To provide for large angular displacements between the shafts, as in the case of a universal joint, two closely arranged joints may be incorporated in the joint unit, wherein the unit includes a driving member, a driven member and an intermediate member, with a first torque transmitting plane of links interposed between the driving member and intermediate member and a second torque transmitting plane of links interposed between the intermediate member and the driven member. Here, the two torque transmitting planes of links are preferably substantially coextensive so as to eliminate any possibility of the intermediate member from shipping or oscillating, the intermediate member substantially bisecting the angle between the angularly displaced axes of the shafts.

The rotary torque transmitting joint of this invention may also be utilized as a torque transmitting coupling between a pair of misaligned shafts. Here, the construction is very much like the double joint construction described immediately above except that the two torque transmitting planes of links are spaced apart. The intermediate member thus rotates about an axis which extends between and intersects the axes of the driving and driven members, and, here also, substantially constant torque is transmitted at substantially constant angular velocity between the two shafts. The rotary torque transmitting joints of this invention in addition to taking care of angular displacement and misalignment of the shafts also take care of linear displacement of the shafts.

Further objects of this invention reside in the details of construction of the rotary torque transmitting joints, universal joints and couplings of this invention and in the cooperative relationships between the component parts thereof.

Other objects and advantages of this invention will become apparent to those skilled in the art upon reference to the accompanying specification, claims and drawings, in which:

Fig. 1 is a side elevational view, partly in section, illustrating one form of the rotary torque transmitting joint of this invention which is in the form of a universal joint;

Fig. 2 is a sectional view taken substantially along the line 2—2 of Fig. 1;

Fig. 3 is a view similar to Fig. 1 but showing the shafts to be angularly displaced;

Fig. 4 is an elevational view of one of the open throated leaf spring links utilized in the form of the invention illustrated in Figs. 1, 2 and 3;

Figs. 5, 6 and 7 are top plan views of the link illustrated in Fig. 4 and illustrating in exaggerated fashion various manners in which the link may be bent or flexed with respect to the torque transmitting plane;

Fig. 8 is a side elevational view of the link and showing it bent in the manner illustrated in Fig. 5;

Fig. 9 is a perspective view illustrating the open throated link formed from a lamination of open throated leaf spring links;

Fig. 10 is an elevational view, partly in section, illustrating another form of the rotary torque transmitting joint of this invention which also takes the form of a universal joint;

Fig. 11 is a vertical sectional view taken substantially along the line 11—11 of Fig. 10;

Figs. 12 and 13 are partial views similar to Figs. 2 and 11 and illustrating two other kinds of open throated links that may be utilized;

Fig. 14 is an elevational view showing still another form of the rotary torque transmitting joint of this invention which is also of the universal joint type and which utilizes two sets of open throated links to provide for larger angular displacement of the shafts;

Fig. 15 is a vertical sectional view taken substantially along the line 15—15 of Fig. 14;

Fig. 16 is a view similar to Fig. 14 but illustrating the shafts angularly displaced;

Fig. 17 is an elevational view, partly in section, illustrating a further form of the rotary torque transmitting joint of this invention which is of the coupling type for coupling together misaligned shafts;

Fig. 18 is a partial view of the center of the joint illustrated in Fig. 2 showing one manner in which the inner portions of the open throated links may be confined for maintaining them in the torque transmitting plane even though there should be an excessive overload on the joint; and Fig. 19 is a sectional view taken substantially along the line 19—19 of Fig. 18.

Referring first to Figs. 1, 2 and 3 there is illustrated one form of rotary torque transmitting joint, generally designated at 10, for joining together in universal fashion a pair of shafts 11 and 12. The shaft 11, which may be considered the driving shaft, has a driving hub 13 suitably secured thereto for rotation therewith. This driving hub 13 is preferably provided with a central guiding boss 14. In a like manner, the shaft 12, which may be considered the driven shaft, carries a driven hub 15 for rotation therewith and here, also, the driven hub 15 is preferably provided with a central guiding boss 16.

A driving member 18, which may be in the form of a ring, is suitably detachably secured to the driving hub 13 and the central opening 19 of the driving member 18 fits over the guide boss 14 for accurately positioning the driving member 18 on the driving hub 13. The driving member 18 is provided with a plurality of ears 20, by way of illustration, three such ears being shown. Each ear 20 is provided with a slot 21 in its face. In a like manner the driven hub 15 has suitably secured thereto a driven member 23, the central hole 24 in the driven member operating in conjunction with the guiding boss 16 for accurately positioning the driven member 23 with respect to the driven hub 15. The driven member 23 is also provided with three ears 25 which in turn are provided with slots 26 in the faces thereof. A plurality of open throated links 28, 29, 30, 31, 32 and 33 are arranged in a torque transmitting plane between the driving and driven members 18 and 23. One end of each of these links is located in the slot 21 of the ear 20 of the driving member 18 and the other end of each of these links is located in the slot 26 of the ears 25 of the driven member 23. These open throated links 28 to 33 may have a V-shaped configuration, the V-portions thereof being inwardly arranged and the outer ends of the outwardly extending arms thereof being located in the slots 21 and 26. These links, as here illustrated, are arranged in edge to edge relationship in the torque transmitting plane. The outer ends of the links are rigidly secured in the slot 21 of the ears 20 by rivets 24 and in the slot 26 of the ears 25 by rivets 35. Because of this rigid connection, afforded by the slots and the rivets, there is no relative movement between the ends of the links and the ears of the driving and driven members 18 and 23 and, accordingly, no lubrication is required. The links 28 to 33 and the driving and driven members 18 and 23 are assembled as a unit and preferably they are assembled in a suitable jig so as to provide concentricity between the driving and driven members 18 and 23. This assembled unit may be readily collapsed and inserted between the driving and driven hubs 13 and 15 and when it is properly guided and located therebetween, the driving member 18 is detachably secured to the driving hub 13 by means of screws 37 and the driven member 23 is detachably secured to the driven hub 15 by screws 38.

The open throated links 28 to 33 are in the form of leaf springs which are wide in the direction of the torque transmitting plane so as to be substantially inflexible in that direction and are thin in a direction normal to the torque transmitting plane so as to be substantially flexible in that direction. The inflexibility of the links in the direction of the torque transmitting plane maintains substantially constant the angular positions of the driving and driven members about their axes of rotation for transmitting substantially constant torque therebetween at substantially constant angular velocity. The flexibility of the links in a direction normal to the torque transmitting plane allows angular displacement of the axes of rotation of the driving and driven members without producing fatiguing stresses in the direction of the torque transmitting plane.

In this connection, reference is made to Figs. 4 to 8 wherein one of the links 28 is illustrated. Here, points 40 and 41 located on the outer ends of the outwardly extending arms of the open throated links are spaced apart a distance equal to the distance between lines A and B when the link is in the normal flat condition. The inner V-portion of the link is designated 42. Now, as shown more particularly in Fig. 5, the ends of the link may be moved out of the torque transmitting plane in substantially a straight line along the lines A and B and when this occurs, the V-portion 42 remains in the torque transmitting plane and the transverse distance between the points 40 and 41 (the distance between lines A and B) remains the same, but the actual distance between the points increases. This flexing of the link does not produce any stress in the link in the direction of the torque transmitting plane so that as the link is so flexed no fatiguing stresses are produced. Since the points 40 and 41 correspond to the positions of the rivets 34 and 35 on the driving and driven members 18 and 23, it is seen that the angular positions of the driving and driven members 18 and 23 remain the same even though the shafts 11 and 12 are angularly displaced. Thus, the links operate to transmit substantially constant torque at substantially constant angular velocity between the driving and driven members and this is true whether the axes of rotation of the shafts 11 and 12 are in alignment or are angularly displaced and this is all accomplished without the production of fatiguing stresses in the direction of the torque transmitting plane. The flexing of the link in the operation of the joint is of the kind illustrated in Figs. 5 and 8 but even if the link were flexed in different manners such as illustrated in Figs. 6 and 7 the same results would follow. In Fig. 6 the link is flexed about the point 41 and here the distance between the points 40 and 41 remains the same, this being indicated by the line C. In Fig. 7 the link is flexed about its center and the point 40 follows the line D and here the actual distance between the points 40 and 41 is decreased slightly. Thus, regardless of how the link should be bent or flexed no fatiguing stresses are built up in the direction of the torque transmitting plane.

Fig. 1 shows the joint in operation when the axis of rotation of the shafts 11 and 12 are in alignment and Fig.

3 shows the manner of operation when the axes E and F of the shafts 11 and 12, respectively, are angularly displaced. The open throated links, rigidly secured to the driving and driven members 18 and 23, operate to maintain the axes of rotation of the shafts in alignment, as illustrated in Fig. 1, or to cause them to intersect in the plane of torque transmission, as illustrated in Fig. 3. Thus the torque transmitting joint of Figs. 1 to 3 is ideally suited as a universal joint, it having complete control over the positions of the shafts 11 and 12.

The rotary torque transmitting joints 10 of Figs. 1 to 3 is capable of handling large torque loads, but to handle still larger torque loads, the links may be formed of laminations of spring leafs as illustrated at 44 in Fig. 9. The lamination of links 44 provide increased torque carrying capacity with very little increase in force required to flex the laminations in a direction normal to the torque transmitting plane. The laminations of links may be readily secured in the joint 10 of Figs. 1 to 3 in the same manner as the single links are secured therein.

The rotary torque transmitting joint 10 of Figs. 1 to 3 operates very well within the torque rating but if an excessive torque should be applied thereto, there may be a tendency to buckle the links 28 to 33 to cause the inner V-portions thereof to tend to move in different directions out of the torque transmitting plane. To prevent such distortion, upon the occurrence of an excess torque load, means may be provided, as illustrated in Figs. 18 and 19, for confining the inner portions of the links within the torque transmitting plane. This means may include a rivet 46 having heads 47 and 48 extending through the central opening formed by the links 28 to 33. The heads 47 and 48 effectively operate to prevent the inner portions of the links from flexing in different directions out of the torque transmitting plane. Since the rivet 46 is loose fitting and since it is ineffective during the normal operation of the joint, lubrication is not required.

Another form of rotary torque transmitting joint, suitable for use as a universal joint, is generally designated at 50 in Figs. 10 and 11. Here, the shafts, driving and driven hubs and driving and driven members may be the same as those illustrated in connection with Figs. 1 to 3 and, accordingly, like reference characters for like parts have been utilized and a further description of these parts is not considered necessary. The joint 50 of Figs. 10 and 11 differs essentially from the joint 10 of Figs. 1 to 3 in the construction and arrangement of the open throated links. Here, links 51, 52, 53, 54, 55 and 56 are utilized. These links may also be V-shaped in configuration but instead of being arranged in edge to edge relationship within the torque transmitting plane, as in Figs. 1 to 3, the outwardly extending arms of the links overlap the outwardly extending arms of the adjacent links. These overlapping links are rigidly secured in the slot 21 of the driving member 18 by rivets 34 and in the slots 26 of the driven member 23 by the rivets 35. The links 51 to 56 flex and operate in the same manner as the links 28 to 33 and, accordingly, a further description of the operation thereof is not considered necessary. The driving and driven members 18 and 23 may be cut away as indicated at 58 and 59 to provide for clearance for the rivets 35 and 34, respectively, as the axes of rotation of the shafts 11 and 12 are angularly displaced. Because of the laminated effect of the links 51 to 56 the joint 50 of Figs. 10 and 11 will transmit somewhat higher torque than the joint 10 of Figs. 1 to 3, but outside of this difference the two joints operate in substantially the same manner for producing substantially the same results. Here also laminations of links, such as illustrated in Fig. 9, may be utilized, and here also the inner portions of the links may be confined as illustrated in Figs. 18 and 19 to prevent flexing of the same out of the torque transmitting plane upon the occurrence of an extreme overload.

While the open throated links, as illustrated in Figs. 1 to 11, have been shown to have a configuration which is substantially V-shaped, the open throated links may have other configurations such as illustrated in Figs. 12 and 13. In Fig. 12 the rotary torque transmitting joint is generally designated at 60 and it utilizes links 61 which are generally W shaped. The ends of the outwardly extending end arms 62 of the links 61 overlap each other and are secured to the driving and driven members 18 and 23 by rivets 34 and 35, respectively. The reverse curve portions 63 of the links 61 operate to provide more flexibility in a direction normal to the torque transmitting plane but outside of this they operate in substantially the same manner for producing substantially the same results as the V-shaped links of Figs. 1 to 11. In Fig. 13 the rotary torque transmitting joint is generally designated at 65 and it utilizes open throated links 66 which are also generally W shaped in configuration but having more curvature than the links 61 of Fig. 12. Here, also the outwardly extending end arms 67 of the links 66 overlap each other and are rigidly secured to the driving and driven members 18 and 23 by the rivets 34 and 35. The reverse curve portion 68 of the links 66 is more graduated than that of the links 61 of Fig. 12 and the amount of overlapping of the links is also greater. This arrangement provides still further flexibility in the direction normal to the torque transmitting plane and yet provides large torque transmitting capacity.

The rotary torque transmitting joint generally designated at 70 in Figs. 14, 15 and 16 is also suitable as a universal joint and it operates in much the same manner as the universal joints described above. However, it includes two torque transmitting planes of open throated levers and an intermediate member so as to accommodate greater angular displacement of the axes of rotation of the shafts 11 and 12. Here, the driving and driven shafts, the driving and driven hubs and the driving and driven members are very much like those described above in connection with the aforementioned jonits and, accordingly, like reference characters have been utilized for like parts and a further description thereof is not considered necessary. Here, an intermediate member 71 is interposed between the driving and driven members 18 and 23, this intermediate member 71 being provided with three equally spaced ears 72 and three equally spaced ears 73. The ears 72 and 73 are arranged in substantially the same rotative plane. A plurality of overlapping V-shaped open throated links 75 are arranged in a first torque transmitting plane, the outer ends of the end arms thereof being rigidly secured in the ears 20 of the driving member 18 and in the ears 73 of the intermediate member 71. A plurality of overlapping V-shaped open throated links 76 are arranged in a second torque transmitting plane with the outer ends of the outwardly extending end arms thereof being rigidly secured in the ears 72 of the intermediate member 71 and the ears 25 of the driven member 23. In lieu of securing the links in place by rivets the edges of the slots in the ears 20, 25, 72 and 73 are peened over to firmly and rigidly clamp the links therein. A single array of three links may be included in each torque transmitting plane, as illustrated for simplicity, or each torque transmitting plane may include an array of six links in overlapping arrangement as illustrated in Fig. 11 or in side by side arrangement as illustrated in Fig. 2. The rotary torque transmitting joint 70 of Figs. 14 to 16 is, therefore, in effect a double joint which will allow substantially twice the amount of angular deflection of the axis of rotation of the shafts 11 and 12.

The two torque transmitting planes of links 75 and 76 are substantially coextensive and, therefore lie in substantially the same plane and this causes the axes of rotation E and F of the shafts 11 and 12, respectively, as illustrated in Fig. 16, to intersect substantially at a point in the coextensive torque transmitting plane. As a result, the positions of the shafts 11 and 12 are accurately controlled and whipping or oscillation of the intermediate member 71 is prevented, the intermediate member 71 substantially bisecting the angle between the axes of rotation E and F of the shafts 11 and 12. Accordingly, the rotary torque transmitting joint 70 is ideally suitable for use as a universal joint. Except for the double action, described above, the manner of operation of the rotary torque transmitting joint 70 is the same as discussed above in connection with the rotary torque transmitting joint 10 and a further description is, therefore, not considered necessary.

A further form of the rotary torque transmitting joint of this invention is generally designated at 80 in Fig. 17 and it is particularly useful as a coupling for misaligned shafts, which shafts are fixedly journaled for rotation. Here, the driving and driven shafts, the driving and driven hubs, and the driving and driven members are the same as those described above and like reference characters have been utilized for like parts. The joint 80 includes an elongated intermediate member 81 which is provided at one end with three equally spaced ears 82 and at the other end with three equally spaced ears 83. A plurality of V-shaped open throated links 85 are arranged in a torque transmitting plane and the outer ends of the outwardly extending end arms thereof are secured in the ears 20 of the driving member 18 and in the ears 82 of the intermediate member 81 by means of rivets 34 and 87, respectively. If desired, the edges of the slots in the ears 20 and 82 receiving the links 85 may also be peened over to aid in rigidly securing the same in place therein. A plurality of V-shaped open throated links 86 are arranged in a second torque transmitting plane and have the outer ends of their outwardly extending end arms secured in the ears 25 of the driven member 23 and the ears 83 of the intermediate member 81 by means of rivets 35 and 88, respectively. Here also, the edges of the slots in the ears 25 and 83 which receive the links may be peened over to assist in rigidly securing the links 86 in place. Because the torque transmitting planes containing the links 85 and 86 are spaced apart the intermediate member 81 is tilted when the driving and driven shafts 11 and 12 are misaligned. The intermediate member 81 will rotate about its rotating axis G which intersects the axis E of the driving shaft 11 in the first torque transmitting plane containing the links 85 and will intersect the axis of rotation F of the driven member 12 at a point in the second torque transmitting plane having the links 86. Since the axis of rotation G of the intermediate member 81 is so fixed by the links 85 and 86, the intermediate member 81 will not whip or oscillate but will rotate uniformly about its axis of rotation G, this being predicated on the fact that the axes of rotation E and F of the shafts 11 and 12 are fixed. Thus, the rotary torque transmitting joint 80 of Fig. 17 is ideally suited as a coupling for misaligned shafts and it operates to transmit substantially constant torque at substantially constant velocity without the building up of fatiguing stresses in the direction of the torque transmitting planes.

While for purposes of illustration, several forms of this invention have been disclosed other forms thereof may become apparent to those skilled in the art upon reference to this disclosure and, therefore, this invention is to be limited only by scope of the appended claims.

I claim as my invention:

1. A rotary torque transmitting joint comprising, a driving member rotating about an axis, a driven member adjacent the driving member and rotating about an axis which is coincident with or intersects the axis of the driving member at a point between the driving and driven members, a plurality of open throated links arranged substantially in a torque transmitting plane between the driving and driven members, each link being wholly located outwardly from the axes of rotation of the driving and driven members and having end arms extending substantially radially outwardly from the axes of rotation of the driving and driven members, means rigidly securing the outer end of one end arm of each link to the driving member and means rigidly securing the outer end of the other end arm of each link to the driven member for rotatably driving the driven member from the driving member, said links being substantially inflexible in the direction of the torque transmitting plane and substantially flexible in a direction normal to the torque transmitting plane for transmitting substantially constant torque between the driving and driven members with substantially constant angular velocity and for compensating for angular displacement of the axes of the driving and driven members without producing stresses in the direction of the torque transmitting plane.

2. A rotary torque transmitting joint for transmitting substantially constant angular velocity without the formation of fatiguing stresses between a driving member rotating about an axis and an adjacent driven member rotating about an axis which intersects the axis of rotation of the driving member comprising, a plurality of open throated links arranged substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

3. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of open throated leaf spring links arranged substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular postions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

4. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of open throated leaf spring links arranged substantially in a torque transmitting plane between the driving and driven members, each leaf spring link including a lamination of leaf springs wholly located outwardly from the axes of rotation of the driving and driven members and having end arms extending radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

5. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of substantially V-shaped links arranged substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular position of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

6. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of substantially V-shaped links arranged edge to edge substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

7. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of open throated links arranged substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, the end arms of said links overlapping the end arms of the next adjacent links, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

8. A rotary torque transmitting joint for tarnsmitting substantially constant torque with substantially constant angular velocity without the formation of fatiguing stresses between a driving member rotating about an axis and an axis and an adjacent driven member rotating about an axis which intersects the axis of rotation of the driving member comprising, a plurality of substantially V-shaped leaf spring links arranged substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

9. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of substantially V-shaped leaf spring links arranged edge to edge substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

10. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of substantially V-shaped leaf spring links arranged substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, the end arms of said links overlapping the end arms of the next adjacent links, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

11. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of open throated leaf spring links arranged substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, means for confining the inner portions of the links substantially in the torque transmitting plane, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

12. A rotary torque transmitting joint for transmitting substantially constant torque with substantially constant angular velocity without the formation of fatiguing stresses between a driving member rotating about an axis and an adjacent driven member rotating about an axis which intersects the axis of rotation of the driving member comprising, a plurality of substantially V-shaped leaf spring links arranged substantially in a torque transmitting plane between the driving and driven members, each link being wholly located outwardly from the axes of rotation of the driving and driven members and having end arms extending substantially radially outwardly from the axes of rotation of the driving and driven members and being wide and substantially inflexible in the direction of the torque transmitting plane but thin and substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, means for confining the inner V-portions of the links in the torque transmitting plane, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

13. A rotary torque transmitting universal joint for transmitting substantially constant torque with substantially constant angular velocity without the formation of fatiguing stresses between a pair of rotating shafts and for maintaining the axes of rotation of said shafts in intersecting relation comprising, a driving member carried by the driving shaft, a driven member carried by the driven shaft adjacent the driving member, a plurality of open throated links arranged substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said inflexibility of said links in the direction of the torque transmitting plane maintaining substantially constant the angular positions of the driving and driven members about their axes of rotation for transmitting substantially constant torque therebetween at substantially constant angular velocity and said flexibility of said links in a direction normal to the torque transmitting plane allowing angular displacement of the axes of rotation of the driving and driven members without producing fatiguing stresses in the direction of the torque transmitting plane.

14. A rotary torque transmitting universal joint for transmitting substantially constant torque with substantially constant angular velocity without the formation of fatiguing stresses between a driving hub carried by a driving shaft and an adjacent driven hub carried by a driven shaft and for maintaining the axes of rotation of the shafts in intersecting relation comprising, a unit including a driving member, a driven member, a plurality of open throated links arranged substantially in a torque transmitting plane between the driving and driven members, each link being wholly located outwardly from the axes of rotation of the driving and driven members and having end arms extending substantially radially outwardly from the axes of rotation of the driving and driven members and being substantially inflexible in the direction of the torque transmitting plane but substantially flexible in a direction normal to the torque transmitting plane, means rigidly securing the outer end of one end arm of each link to the driving member and means rigidly securing the outer end of the other end arm of each link to the driven member for rotatably driving the driven member from the driving member, said unit being compressible for insertion between the driving and driven hubs, and means detachably securing the driving and driven members to the driving and driven hubs respectively.

15. A rotary torque transmitting joint for transmitting substantially constant torque with substantially constant angular velocity without the formation of fatiguing stresses between a driving member rotating about an axis and an adjacent driven member rotating about an axis comprising, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member from the driving member, all of said links being substantially inflexible in the direction of the torque transmitting planes but substantially flexible in a direction normal to the torque transmitting planes.

16. A rotary torque transmitting universal joint for transmitting substantially constant torque with substantially constant angular velocity without the formation of fatiguing stresses between a pair of rotating shafts and for maintaining the axes of rotation of said shafts in intersecting relation comprising, a driving member carried by the driving shaft, a driven member carried by the driven shaft adjacent the driving member, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member, all of said links being substantially inflexible in the direction of the torque transmitting planes but substantially flexible in a direction normal to the torque transmitting planes, said torque transmitting planes between the driving and intermediate members and the intermediate and driven members being substantially coextensive.

17. A rotary torque transmitting coupling for transmitting substantially constant torque with substantially constant angular velocity without the formation of fatiguing stresses between a pair of misaligned rotating shafts comprising, a driving member carried by the driving shaft, a driven member carried by the driven shaft, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member, all of said links being substantially inflexible in the direction of the torque transmitting planes but substantially flexible in a direction normal to the torque transmitting planes, said torque transmitting plane between the intermediate and driven members being spaced apart from the torque transmitting plane between the driving and intermediate members.

18. A rotary torque transmitting joint for transmitting substantially constant torque with substantially constant angular velocity without the formation of fatiguing stresses between a driving hub carried by a driving shaft and a driven hub carried by a driven shaft comprising, a unit including a driving member, a driven member, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member, all of said links being substantially inflexible in the direction of the torque transmitting planes but substantially flexible in a direction normal to the torque transmitting planes, said unit being compressible for insertion between the driving and driven hubs, and means detachably securing the driving and driven members to the driving and driven hubs respectively.

19. A rotary torque transmitting universal joint for transmitting substantially constant torque with substantially constant angular velocity without the formation of fatiguing stresses between a driving hub carried by a driving shaft and an adjacent driven hub carried by a driven shaft and for maintaining the axes of rotation of the shafts in intersecting relation comprising, a unit including a driving member, a driven member, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member, all of said links being substantially inflexible in the direction of the torque transmitting planes but substantially flexible in a direction normal to the torque transmitting planes, said torque transmitting planes between the driving and intermediate members and the intermediate and driven members being substantially coextensive, said unit being compressible for insertion between the driving and driven hubs, and means detachably securing the driving and driven members to the driving and driven hubs respectively.

20. A rotary torque transmitting coupling for transmitting substantially constant torque with substantially constant angular velocity without the formation of fatiguing stresses between a driving hub carried by a driving shaft and a driven hub carried by a driven shaft which is misaligned with respect to the driving shaft comprising, a unit including a driving member, a driven member, an intermediate member, a first group of open throated links arranged substantially in a torque transmitting plane between the driving and intermediate members, each link being wholly located outwardly from the axis of rotation of the driving member and having end arms extending substantially radially outwardly from the axis of rotation of the driving member, means rigidly securing the outer end of one end arm of each link of the first group to the driving member and means rigidly securing the outer end of the other end arm of each link of the first group to the intermediate member for rotatably driving the intermediate member from the driving member, a second group of open throated links arranged substantially in a torque transmitting plane between the intermediate and driven members, each link being wholly located outwardly from the axis of rotation of the driven member and having end arms extending substantially radially outwardly from the axis of rotation of the driven member, means rigidly securing the outer end of one end arm of each link of the second group to the intermediate member and means rigidly securing the outer end of the other end arm of each link of the second group to the driven member for rotatably driving the driven member from the intermediate member, all of said links being substantially inflexible in the direction of the torque transmitting planes but substantially flexible in a direction normal to the torque transmitting planes, said torque transmitting plane between the intermediate and driven members being spaced apart from the torque transmitting plane between the driving and intermediate members, said unit being compressible for insertion between the driving and driven hubs, and means detachably securing the driving and driven members to the driving and driven hubs respectively.

References Cited in the file of this patent

UNITED STATES PATENTS

| | | |
|---|---|---|
| 1,601,223 | Naugler | Sept. 28, 1926 |
| 2,146,547 | Lundgren | Feb. 7, 1939 |
| 2,181,888 | Gustin | Dec. 5, 1939 |
| 2,630,692 | Naugler | Mar. 10, 1953 |